(No Model.)
S. A. BEMIS.
CAR SPRING.
No. 264,921.     Patented Sept. 26, 1882.
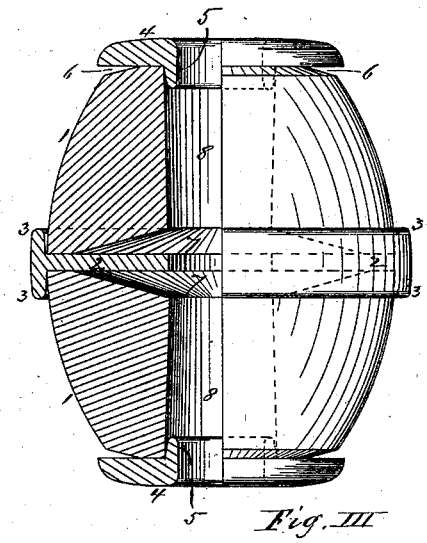
Fig. III
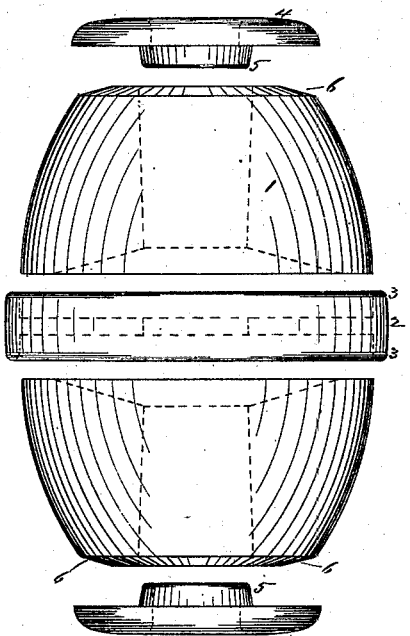
Fig. II
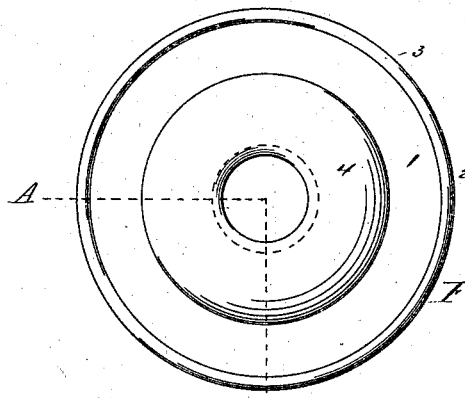
Fig. I
Witnesses.
Chas. H. Wood.
N. E. Dunnell.
Inventor.
Sumner A. Bemis,
By T. A. Curtis,
his atty.

UNITED STATES PATENT OFFICE.

SUMNER A. BEMIS, OF SPRINGFIELD, MASSACHUSETTS.

CAR-SPRING.

SPECIFICATION forming part of Letters Patent No. 264,921, dated September 26, 1882.

Application filed August 2, 1882. (No model.)

*To all whom it may concern:*

Be it known that I, SUMNER A. BEMIS, of Springfield, in the county of Hampden and State of Massachusetts, have invented a new and useful Improved Railway-Car Spring, of which the following is a description and specification.

The object of my invention is to provide a cheap and effective spring for railway-cars, which shall be capable of sustaining the weight brought to bear upon it and give an easy motion to the car, and which may be renewed, in whole or in parts, when too much worn for further use; and I accomplish this by the means substantially as hereinafter described, and illustrated in the accompanying drawings, in which—

Figure I is a plan view of a car-spring made according to my invention. Fig. II is a side view of the different parts of the spring as arranged to be put together, and Fig. III is a vertical section of the spring with all its parts together at line A of Fig. I.

In the drawings, 4 represents a metal disk, provided with a vertical annular flange, as 5, and 2 represents a metal disk or circular plate of a T shape at its outer edge, or provided with an annular flange, as 3, projecting at right angles from the plane of its sides at its periphery, both above and below.

1 represents a rubber spring, circular in plan and half of an ellipse in its general form, cut midway the length of its major axis, and with the smaller end cut parallel with its larger end, as shown clearly in Figs. II and III, and the smaller end is beveled outward, as shown at 6, and the larger end is beveled inward at 7, as shown clearly in Fig. III, and, if desired, if the spring is to be secured to the car by a pin, a central hole, as 8, may be made through the rubber, of a size at the smaller end to receive the annular flange, as 5, on the disk, as 4, in which the latter has a central hole, as 9, made therein, and the plate, as 2, would also have a central hole, as 11. If, however, the spring is to be secured to a car by other means than a pin, the smaller end of the rubber may have a cavity or recess made therein to receive the annular flange, as 5, on the disk 4.

In putting the spring together two of the disks, as 4, are used, one at each end, and one of them is laid on a support, or, if secured to a car, is laid in a socket with its flange, as 5, uppermost, and the smaller end of the rubber is placed upon the disk, its line of bearing being just outside the flange, as 5. The plate, as 2, is then placed upon the larger end of the same rubber, with the lower flange, as 3, of said plate extending down around the outside of the rubber, the line of bearing of the large end of the rubber against the lower side of the plate being just inside the flange 3. Another rubber—a duplicate of the first—is then placed upon the upper side of the plate 2, with its larger end down and just within the upper flange, as 3, and another disk, as 4—a duplicate of the lower one—is placed upon the upper and smaller end of the upper rubber, with its flange, as 5, within the central hole or cavity of the rubber.

It will be seen that by this construction of a railway-car spring all the parts above the plate 2 are duplicates of those below it, and the plate itself may be used either side uppermost. Consequently the spring itself may be used either end up, and if any of the parts should wear out they may be duplicated from one pattern or mold. It is also an advantage that if any particular part is liable to more wear than another the parts may be interchanged in regard to position, so that the wear may be more uniform on all the parts. For example, if there should be more wear upon the lower rubber than the upper one on account of position, both may be taken out, and the lower one placed above the plate and the upper one placed below, and both used in this position for a time until both are in the same condition.

When a car supplied with these springs is lightly loaded the rubbers, as 1, at both their ends will have their bearings against the disks, as 4, and plate 2, in substantially the manner and at the points as shown in Fig. III; but if the car is loaded heavily the disks, as 4, will flatten more or less, the smaller ends of the rubbers taking a bearing more upon the beveled portions of the smaller ends, the flange, as 5, on each disk preventing the extreme ends of the rubber from being forced inward out of position. At the same time the flanges, as 3, on the plate 2 prevent the outer portions of the rubbers at the larger ends from being forced outward from their proper position, and these larger ends of the rubbers are thereby flattened without being moved out of place by the greater force of the heavy load. The full elasticity of the spring is utilized in this construction from the fact that the bearing of the disk 4 against the rubber at the small end is in a direction in which the rubber has no bearing at the larger end, and the bearing of the plate 2 against the larger end is in a direction in which the rubber has no bearing at the smaller end until both ends of each rubber are flattened against the plate and the disks.

Having thus described my invention, what I claim as new is—

In an improved railway-car spring, the combination of a plate provided with a flange at its outer edge, projecting from each side at right angles thereto, two metal disks, each provided with a central hole, and a flange extending around said hole at right angles to the face of the disk, and two rubber pieces or springs, each having an outer bevel, a space between the disk and the outer portion of the rubber at the smaller end, and a bevel or space between the inner portion of said plate and the rubber at its larger end, substantially as described.

SUMNER A. BEMIS.

Witnesses:
T. A. CURTIS,
N. E. DWINNELL.